United States Patent [19]
Otake

[11] Patent Number: 5,689,178
[45] Date of Patent: Nov. 18, 1997

[54] SELF-OSCILLATION TYPE DC-DC CONVERTER HAVING A DRIVING TRANSISTOR CONNECTED IN PARALLEL TO A CIRCUIT ELEMENT FOR STARTING A SWITCHING ELEMENT

[75] Inventor: Tetsushi Otake, Tokyo, Japan

[73] Assignee: Toko, Inc., Tokyo, Japan

[21] Appl. No.: 680,772

[22] Filed: Jul. 16, 1996

[30] Foreign Application Priority Data

Jul. 25, 1995 [JP] Japan .................. 7-209210

[51] Int. Cl.⁶ .................. G05F 1/40; G05F 1/42; G05F 1/607
[52] U.S. Cl. .................. 323/282; 323/284; 323/289
[58] Field of Search .................. 323/282, 284, 323/289

[56] References Cited

U.S. PATENT DOCUMENTS

| | | | |
|---|---|---|---|
| 4,859,927 | 8/1989 | Meijer | 323/289 |
| 4,903,182 | 2/1990 | Pilukaitis et al. | 323/289 |
| 5,389,871 | 2/1995 | Otake | 323/289 |

*Primary Examiner*—Peter S. Wong
*Assistant Examiner*—Bao Q. Vu
*Attorney, Agent, or Firm*—Frishauf, Holtz, Goodman, Langer & Chick, P.C.

[57] ABSTRACT

The present invention provides a self-oscillation type DC-DC converter that can perform self-oscillating operation without disposing a feedback winding in a choke coil and realizes the high efficiency, small size and low cost by using a MOSFET as a switching element. The self-oscillation type DC-DC converter comprises a switching transistor Q12 being a P-MOSFET; a first PNP type driving transistor Q2, the collector and emitter of which are connected to the gate and source of the switching transistor Q12, respectively and the base of which is connected to the switching transistor Q12 through a feedback circuit 3; and a second NPN type driving transistor Q3, the gate of the switching transistor Q12 being connected to the ground through the collector and emitter of the second driving transistor Q3 and the base of the second driving transistor Q3 being connected to the feedback circuit 3 through a capacitor C4.

8 Claims, 2 Drawing Sheets

SELF-OSCILLATION TYPE DC-DC CONVERTER HAVING A DRIVING TRANSISTOR CONNECTED IN PARALLEL TO A CIRCUIT ELEMENT FOR STARTING A SWITCHING ELEMENT

BACKGROUND OF THE INVENTION

1. Field of the Invention

The present invention relates to circuit technology for a DC-DC converter in which omission of a feedback winding of a choke coil for self-oscillation and use of an FET for low loss and high speed operation are simultaneously implemented in a buck and non-isolated type DC-DC converter.

2. Description of the Prior Art

A self-oscillation type DC-DC converter has been used as a power supply that is small in output power capacity and is relatively cheap in cost because of its simplicity in a circuit structure and a small number of circuit elements to be used.

The inventor of the present invention proposed a self-oscillation type DC-DC converter having a circuit structure as shown in FIG. 1 of the present application, which is described in U.S. Pat. No. 5,389,871, as such a DC-DC converter. It should be noted that in FIG. 1 references numerals 1 and 2 are input and output terminals in a high voltage side of the self-oscillation type DC-DC converter and input and output terminals in a low voltage side are handled as the ground because these are grounded.

A switching transistor Q11, which is a PNP transistor, and a choke coil L1 are connected in series between input and output terminals 1 and 2, and forms a buck chopper type DC-DC converter together with a diode D1 and a smoothing capacitor C2 connected across choke coil L1, respectively.

In order to allow the switching transistor Q11 to perform self-oscillation operation, a resistor R1 is connected between a base of the switching transistor Q11 and the ground, and the collector and emitter of a driving transistor Q2, which is a PNP type transistor, are connected between the base and emitter of the switching transistor Q11, respectively. The base of this driving transistor Q2 is connected to not only the base of the switching transistor Q11 through a resistor R2 but also to the collector thereof through a feedback circuit 3.

Although the feedback circuit 3 as shown in FIG. 1 is constituted by a series circuit of a resistor R3 and a capacitor C3, it should be not limited to the constitution as described in U.S. Pat. No. 5,389,871 mentioned above. A control circuit is indicated at 4, which comprises resistors R4 and R5, resistors R6 and R7 for an output voltage detection, a transistor Q4 and a voltage regulating diode DZ, thereby stabilizing the output voltage.

An outline of operation of the circuit as shown in FIG. 1 is as follows:

A voltage across the choke coil generating according to operation states of the switching transistor Q11 applies a forward bias or a reverse bias to the base of the driving transistor Q2 through the feedback circuit 3; since this driving-transistor Q2 controls an operation state of the switching transistor Q11, the driving transistor Q2 and switching transistor Q11 perform complementarily ON and OFF operations based on the current flowing to the feedback circuit 3; the control circuit 4 leads the base current of the driving transistor Q2 to the collector of a transistor Q4 according to a value of the output voltage and causes to change an on-duty of the driving transistor Q2; an on-duty of the switching transistor Q11 changes by change of the on-duty of the driving transistor Q2; and thus, the output voltage can be controlled constantly.

Like this, in the self-oscillation type DC-DC converter as shown in FIG. 1, the feedback winding applied to a choke coil, which is required to the self-oscillation DC-DC converter until now, may be needless by presence of the driving transistor Q2 and the feedback circuit. Thus, a coil part having a single-winding can be used in the choke coil L1 and this DC-DC converter has an technical advantage that it will be possible to make the DC-DC converter small and reduce the cost.

Measures for dissipating heat in the power supply are the great problem to be solved in case of making the power supply small and reducing the cost. Efficiency of the power supply has large relation to quantity of heat generating in a circuit and affects its shape and cost. Needless to say, the higher in efficiency of the power supply, the better.

Comparing a MOSFET, one of the unipolar transistor, with a bipolar transistor, the MOSFET has an outstanding advantage that it is more rapid in an operation speed and less in power consumption than the bipolar transistor. For this, it is generally well known that efficiency increases if the MOSFET is substituted for the bipolar transistor as a switching element of the DC-DC converter. However, since a minimum driving voltage of the MOSFET is 2–3 volts while that of the bipolar transistor is 0.7 volts, a condition in use is restricted resulting from the minimum driving voltage of the MOSFET in its use.

Consideration will be made, regarding the case of substituting merely the P channel MOSFET (hereinafter referred as to the P-MOS) for the switching transistor Q11 in the PNP type bipolar transistor, for example, in the circuit shown in FIG. 1.

First, when the driving transistor Q2 is in an on-state, a gate potential of the switching transistor Q11 (P-MOS) and a base potential of the driving transistor Q2 are as follows.

When the driving transistor Q2 is in an on-state, the diode D1 becomes conductive because a flyback voltage is generated in the choke coil L1, and the base potential of the driving transistor Q2 has a value close to the ground potential due to the feedback circuit 3. Also, the gate potential of the switching transistor Q11 reaches a value equal to an input voltage because of the on-state of the driving transistor Q2. Thereby the switching transistor Q11 and the driving transistor Q2, relatively, maintain the off-state or the on-state.

On the contrary, when the driving transistor Q2 is in an off-state, a gate potential of the switching transistor Q11 (P-MOS) and a base potential of the driving transistor Q2 are as follows.

The base potential of the driving transistor Q2 just prior to a turning-off of the driving transistor Q2 has rizen up to a value close to the input voltage $V_{IN}$. When the driving transistor Q2 turns on, the gate potential of the switching transistor Q11 reaches a potential value corresponding to a value multiplying the base potential of the driving transistor Q2 by a ratio of the resistors R1 and R2. With respect to the resistor R1, it is necessary to use a part having a high resistance value in order to suppress the collector current of the driving transistor Q2 as low as possible.

However, the gate potential of the switching transistor Q11 becomes high by means of a high resistance value of the resistor R1, so that a voltage $V_{GS}$ between the gate and source of the switching transistor Q11 does not reach a voltage necessary to switching operation according to condition, and the switching transistor Q11 does not become to be the on-state or it becomes to be an incomplete state, namely a state having a high electric resistance between the source and drain, even if it becomes to be the on-state.

In this connection, it has been confirmed that in case of substituting merely the P-MOS for the switching transistor Q11 as shown in FIG. 1 in a power supply of a certain specification, a normal operation cannot be done unless there is a voltage difference greater than 10 volts between the input voltage $V_{IN}$ and output voltage $V_O$. Assuming a cell, a battery and other portable one as an external power supply, the condition of the voltage difference more than 10 volts between the input and output voltages $V_{IN}$ and $V_O$ is almost impossible except special cases. Thus, in FIG. 1 the switching transistor Q11 is, in fact, limited to the bipolar transistor.

SUMMARY OF THE INVENTION

Therefore, an object according to the present invention is to make it possible to use a MOSFET as a switching transistor as well as to perform self-oscillation by no means of a feedback winding of a choke coil. As a result, it is to realize a high efficiency and a small size of the self-oscillation DC-DC converter.

In a non-isolated, self-oscillation type DC-DC converter for turning on and off an inputted DC voltage by means of the switching element and supplying a stabilized dc output voltage to a load through a smoothing circuit including a diode, a choke coil and a smoothing capacitor connected to a current output terminal of a switching element, the self-oscillation type DC-DC converter comprises:

wherein said switching element is a MOSFET;

a first driving transistor, a current input terminal thereof being connected to the current output terminal of said switching element and a current input terminal thereof being connected to said control terminal of said switching element;

a feedback circuit, the feedback circuit being connected between a current output terminal of said switching element and said control terminal of said first driving transistor; and a second driving transistor for connecting said control terminal of said switching element to the ground, operating complementarily with said first driving transistor, in the concrete, a main current path of said second driving transistor being connected in parallel a resistor or a diode coupled to the gate of said switching transistor and said a control terminal of said second driving transistor being connected to said feedback circuit including a series circuit of a resistor and a capacitor through a capacitor element.

The gate and source of the switching transistor, which is a P-MOS, are connected to the collector and emitter of the first driving transistor of a PNP type transistor, respectively. The base of the first driving transistor is connected to the drain of the switching transistor through the feedback circuit consisting of the series circuit of the resistor and the capacitor. The gate of the switching transistor is connected to the ground through the collector and emitter of the second driving transistor of an NPN type transistor and the base of the second driving transistor is connected to the feedback circuit through the capacitor element.

In operation, when the first driving transistor turns on, the gate potential of the switching transistor drops and the switching transistor becomes conductive between the source and drain thereof. For this, the drain potential rises and the base of the first driving transistor is reverse-biased, and the base of the second driving transistor is forward-biased. By means of each bias, the first driving transistor maintains an off-state and the second driving transistor turns on. Because of the turn-on state of the second driving transistor, the gate potential of the switching transistor drops to the ground potential and it is possible for the switching transistor to transfer to a complete on-state.

DESCRIPTION OF THE PREFERRED EMBODIMENT

Figure 2:
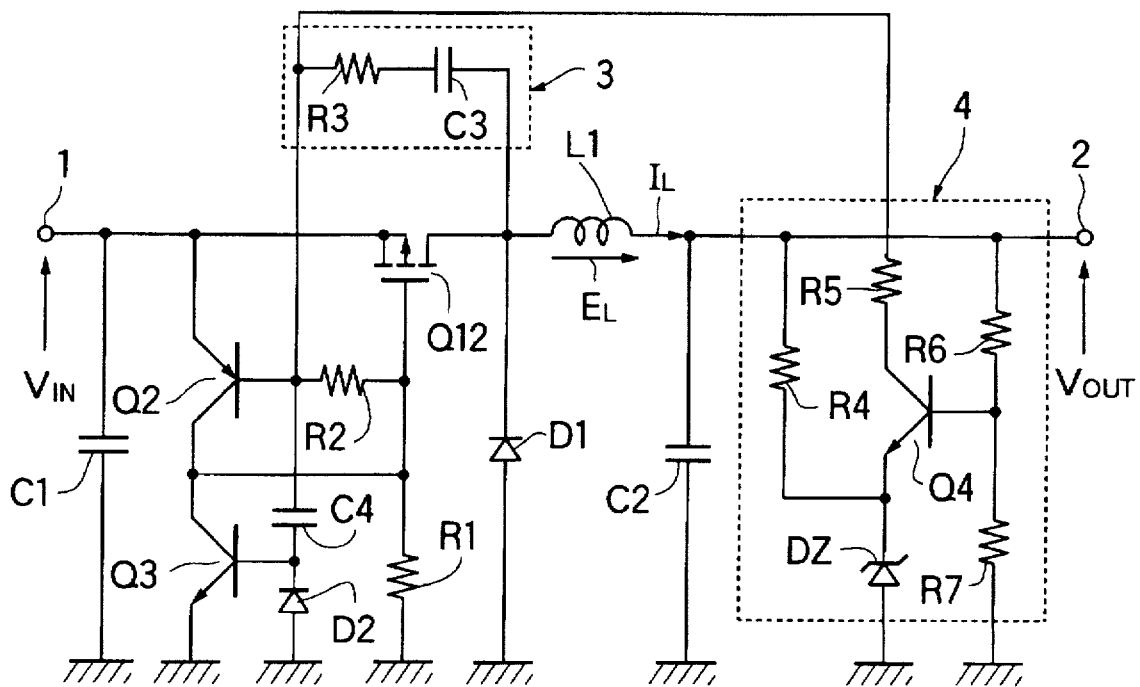
FIG. 2 illustrates a circuit diagram of a first embodiment of a self-oscillation DC-DC converter according to the present invention.

Referring to FIG. 2, a self-oscillation type DC-DC converter according to the present invention is shown in which a MOSFET can be used as a switching element as well as a feedback winding may be removed from a choke coil.

The DC-DC converter as shown in FIG. 2 has the following circuit structures. Referring now to FIG. 2, wherein like reference numerals designate identical or corresponding to parts in FIG. 1.

A buck type chopper circuit is constituted by connecting in series the source and drain of a switching transistor Q12 of a P-channel type MOSFET and a choke coil L1 between input and output terminals and connecting a diode D1 and a smoothing capacitor C2 across the choke coil L1, each one terminal of which is grounded.

The collector and emitter of a transistor Q2 as a first driving transistor of a PNP type bipolar transistor are connected between the gate and source of the switching transistor Q12, respectively, and the base of the transistor Q2 is connected to the drain of the switching transistor Q12 through the feedback circuit 3 consisting of a series circuit of a resistor R3 and a capacitor C3. Further, the base of the transistor Q2 is connected to the gate of the switching transistor Q12 through a resistor R2.

A resistor R1 and a transistor Q3 as a second driving transistor which is an NPN type bipolar transistor having a current path between the collector and emitter thereof, which is parallel to the resistor R1, are connected between the gate of the switching transistor Q12 and the ground, and the base of the transistor Q3 is connected to the feedback circuit 3 through a capacitor C4. A diode D2 forming a discharging path of a capacitor C4 is connected between the base of the transistor Q3 and the ground.

A control circuit 4 is constituted by: a series circuit of resistors R6 and R7; a series circuit of a resistors R4 and a voltage regulating diode DZ; a transistor Q4, the base of which is connected to a dividing point of an output voltage by means of the resistors R6 and R7 (a connection point of the resistors R6 and R7) and the emitter of which is connected to a connection point of the resistor R4 and the constant voltage diode DZ; and a resistor R5 connected between a collector of the transistor Q4 and the feedback circuit 3. The control circuit 4 takes a role to stabilize an output voltage.

Operation of self-oscillation in the circuit including the above-mentioned structures will be described with reference to FIG. 2.

When the switching transistor Q12 is in an on-state, current $I_L$ increasing linearly flows to the choke coil L1, thereby charging the smoothing capacitor C2 and causing a voltage between terminals thereof to rise.

When the voltage between terminals of the capacitor C2 rises by means of charge, the transistor Q4 of the control circuit 4 begins to lead the base current of the transistor Q2 soon and the transistor Q2 conducts between the collector and emitter thereof. Then, a voltage $V_{GS}$ between the gate and source of the switching transistor Q12 changes to limit the drain current thereof. When the drain current of the switching transistor Q12, namely the current $I_L$ flowing to the choke L1 decreases, a flyback voltage $E_L$ generates in the choke coil L1.

The flyback voltage $E_L$ as generated in this choke coil L1 draws the base current of the transistor Q2 through the feedback circuit to cause the transistor Q2 to transfer to an on-state, and at the same time, to cause the transistor Q3 to transfer to an off-state by applying a reverse bias to the base of the transistor Q3.

The gate potential of the switching transistor Q12 rises because the transistor Q2 becomes conductive and the transistor Q3 becomes non-conductive. Thereby the voltage $V_{GS}$ between the gate and source decreases until the on-state cannot be maintained, and then the switching transistor Q12 turns off.

While the switching transistor Q12 is in the off-state, the transistor Q2 is in the on-state and the transistor Q3 is in the off-state, decrease of the flyback voltage at the choke coil L1 and of the voltage between terminals of the smoothing capacitor C2 by means of discharge of energy, and increase of the voltage across a capacitor C3 by means of charge of the capacitor C3 of the feedback circuit 3 progress. The transistor Q2 cannot maintain the on-state soon and transfers to the off-state. When the transistor Q2 transfers to the off-state, a gate potential of the switching transistor Q12 decreases and the voltage $V_{GS}$ between the gate and source increases, so that the switching transistor Q12 conducts between the source and drain thereof.

Thereby the drain potential of the switching transistor Q12 increases, and a reverse bias is applied to the base of the transistor Q2 and a forward bias to the base of the transistor Q3 through the feedback circuit 3. By means of each bias the transistor Q2 maintains the off-state, and to the contrary, the transistor Q3 turns on.

The gate potential of the switching transistor Q12 decreases up to the ground potential resulting from transition to the off-state of the transistor Q2 and the on-state of the transistor Q3, the voltage $V_{GS}$ between the gate and source further increases and the switching transistor Q12 can transfer to the complete on-state.

The current $I_L$ flows to the choke coil L1 resulting from transition to the on-state of the switching transistor Q12, and operation as described above can be repeated.

Figure 3:
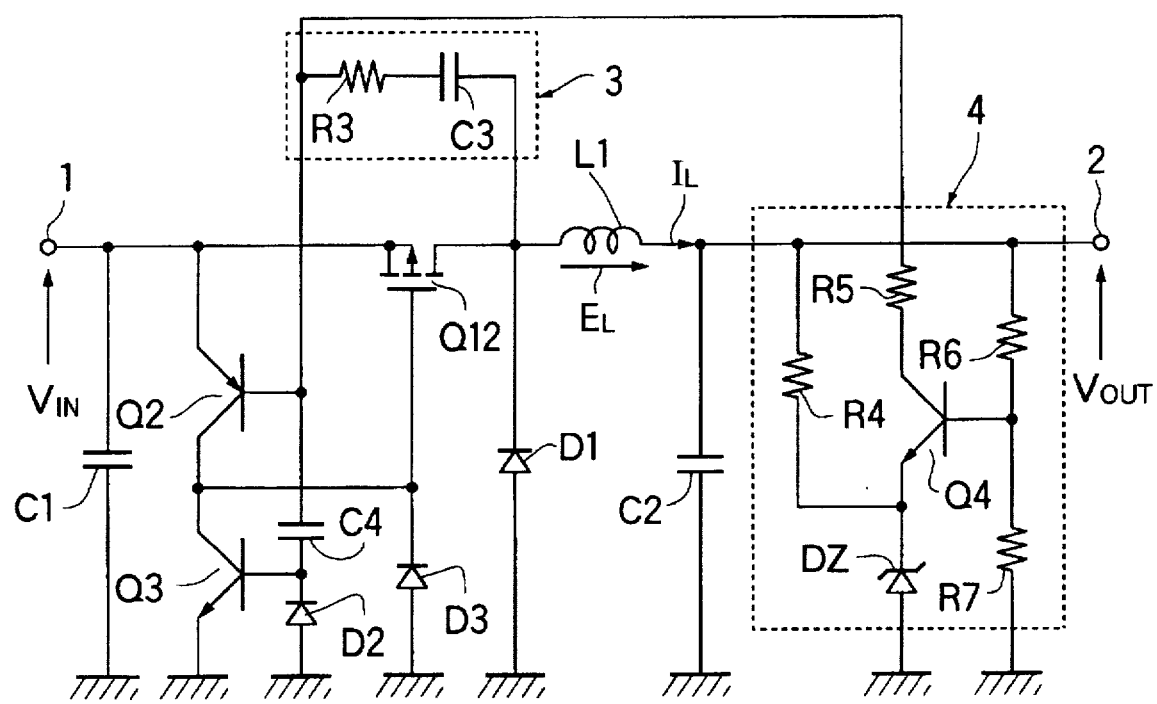
FIG. 3 illustrates a circuit diagram of a second embodiment of a self-oscillation DC-DC converter according to the present invention.

FIG. 3 illustrates a circuit diagram of a second embodiment of a self-oscillation DC-DC converter according to the present invention.

The circuit structures as shown in FIG. 3 is such that a diode D3, the anode of which is grounded, is substituted for the resistor R3 as shown in FIG. 2, the resistor R2 is removed from the circuit and the others are identical to FIG. 2.

Features of the circuit as shown in FIG. 3 is functions of the diode D3, and there are the following advantages compared with the circuit in FIG. 2. Namely, the resistor R1 is provided to conduct between the source and drain of the switching transistor Q12, but when the transistor Q2 turns on, the current flows to the resistor R1 and this becomes a cause of occurrence of a loss. On the contrary, when the transistor Q2 turns on, the current does not flow to the diode D3 and a loss does not occur. Therefore efficiency in the circuit of the self-oscillation DC-DC converter can be improved.

Operation of the circuit as shown in FIG. 3 is the same as that of the circuit as shown in FIG. 2 except function of the diode D3 as described above, and its explanation is omitted.

Figure 1:
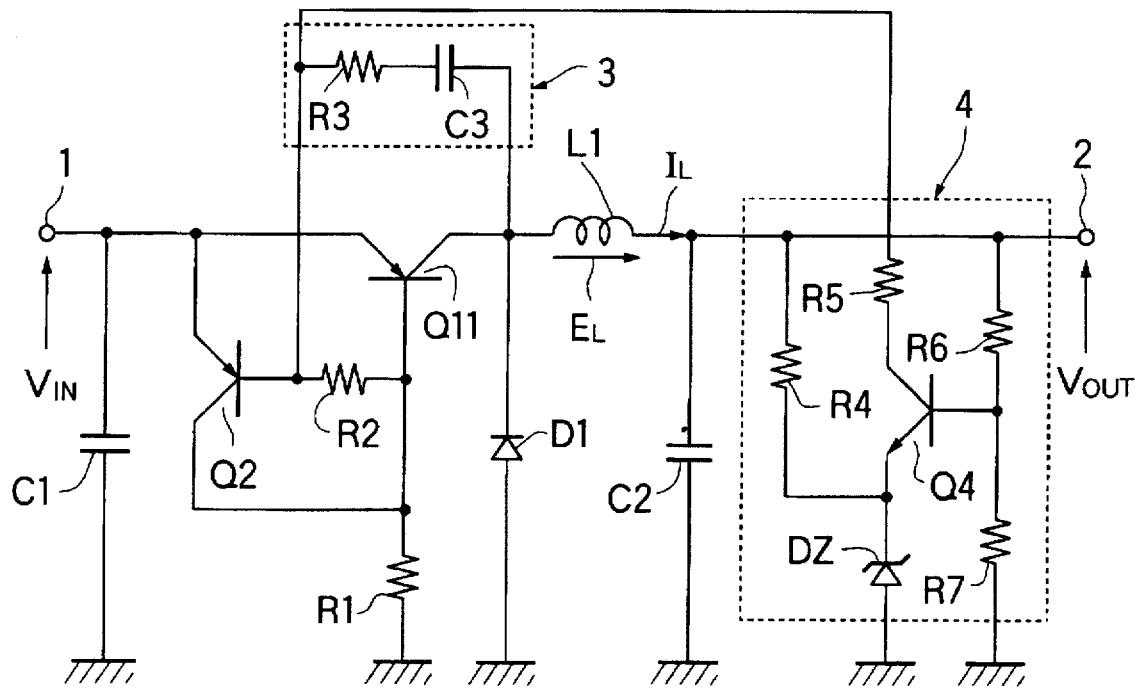
FIG. 1 illustrates a circuit diagram of a conventional self-oscillation DC-DC converter.

Since the DC-DC converter having circuit structures as shown in FIGS. 2 and 3 uses the MOSFET as the switching element, it is needless to say that high efficiency can be obtained comparing with the circuit as shown in FIG. 1, and even if the voltage difference between the input and output is 1 volt in specification, the normal operation can be performed as well as in case that the bipolar transistor is used even if the MOSFET is used as the switching element.

In the circuits in FIGS. 2 and 3 as mentioned above, the base of the transistor Q3 as the second driving transistor is connected to an output end of the feedback circuit 3 (namely, the base of the first driving transistor Q2) through the capacitor C4, but without limiting to this, may be connected to an input end of the feedback circuit 3 (namely, the drain of the switching transistor Q12) or a connection point of the resistor R3 and the capacitor C3.

In the circuit in FIG. 2, the resistor R2 may be deleted from the circuit in certain circumstances and on the contrary, in case of connecting in series a resistor for preventing the overcurrent at starting time to the collector of the transistor Q3, there is a case that a resistor for limiting the base current is connected in series to the capacitor C4. Likely in the circuit in FIG. 3, in certain circumstances, in case of connecting in series a resistor for preventing the overcurrent at starting time to the collector of the transistor Q3, there is a case that a resistor for limiting the base current is connected in series to the capacitor C4.

As described above, the present invention comprises: the current input and output terminals of the first driving transistor being connected between the current input terminal and the control terminal of the switching element; the control terminal of the first driving transistor being connected to the current output terminal of the switching transistor through the feedback circuit; the current input and output terminals of the second driving transistor being connected between the control terminal of the switching element and the ground; and the control terminal of the second driving transistor being connected to the feedback circuit through the capacitor.

According to the circuit of the present invention, even if a device of a single winding coil is used in the choke coil, since the self-oscillation can be done and the feedback winding is not required, the cost of the DC-DC converter has been reduced and it becomes small in size. Also, since the MOSFET can be used for the switching element, the efficiency of the DC-DC converter has been improved. Due to this efficiency improvement, measure for dissipating heat becomes easy, and further, the cost would be reduced and the size would be gotten smaller. In addition, even if the MOSFET has been used for the switching element, in the same manner as the case of the bipolar transistor, the normal operation can be also performed in specification of the small voltage difference between the input and output.

I claim:

1. In a non-isolated self-oscillation type DC-DC converter for turning on and off an inputted dc voltage by means of a switching element and supplying a stabilized dc output voltage to a load through a smoothing circuit including a diode, a choke coil and a smoothing capacitor connected to a current output terminal of the switching element, the self-oscillation type DC-DC converter comprising:

wherein said switching element is a MOSFET, a control terminal of said switching element being connected to ground through a starting resistor;

a first driving transistor, a current input terminal of which is connected to a current input terminal of said switching element and a current output terminal of which is connected to a control terminal of said switching element;

a feedback circuit, the feedback circuit being connected between said current output terminal of said switching element and a control terminal of said first driving transistor; and a second driving transistor, a main current path of which is connected in parallel to said starting resistor, and a control terminal of which being connected to said feedback circuit through a capacitor element.

2. In a non-isolated self-oscillation type DC-DC converter for turning on and off an inputted dc voltage by means of a switching element and supplying a stabilized dc output voltage to a load through a smoothing circuit including a diode, a choke coil and a smoothing capacitor connected to a current output terminal of the switching element, the self-oscillation type DC-DC converter comprising:

wherein said switching element is a MOSFET, a control terminal of said switching element being connected to ground through a starting diode;

a first driving transistor, a current input terminal of which is connected to a current input terminal of said switching element and a current output terminal of which is connected to a control terminal of said switching element;

a feedback circuit, the feedback circuit being connected between said current output terminal of said switching element and a control terminal of said first driving transistor; and a second driving transistor, a current input terminal of which being connected in parallel to said starting diode, and a control terminal of which being connected to said feedback circuit through a capacitor.

3. The self-oscillation type DC-DC converter according to claim 1 wherein said feedback circuit consists of a series circuit of a resistor and a capacitor.

4. The self-oscillation type DC-DC converter according to claim 2 wherein said feedback circuit consists of a series circuit of a resistor and a capacitor.

5. The self-oscillation type DC-DC converter according to claim 1 further comprising a control circuit for detecting the output voltage and outputting a control signal according to said output voltage, an output terminal of said control circuit being connected to said control terminal of said first driving transistor, thereby controlling a base current of said first driving transistor according to said output voltage, causing to change an off-time of said switching element, and keeping said output voltage constant.

6. The self-oscillation type DC-DC converter according to claim 2 further comprising a control circuit for detecting the output voltage and outputting a control signal according to said output voltage, an output terminal of said control circuit being connected to said control terminal of said first driving transistor, thereby controlling a base current of said first driving transistor according to said output voltage, causing to change an off-time of said switching element, and keeping said output voltage constant.

7. The self-oscillation type DC-DC converter according to claim 1 further comprising a control circuit for detecting the output voltage and outputting a control signal according to said output voltage, an output terminal of said control circuit being connected to said control terminal of said first driving transistor through said feedback circuit, thereby controlling a base current of said first driving transistor according to said output voltage, causing to change an off-time of said switching element, and keeping said output voltage constant.

8. The self-oscillation type DC-DC converter according to claim 2 further comprising a control circuit for detecting the output voltage and outputting a control signal according to said output voltage, an output terminal of said control circuit being connected to said control terminal of said first driving transistor through said feedback circuit, thereby controlling a base current of said first driving transistor according to said output voltage, causing to change an off-time of said switching element, and keeping said output voltage constant.

* * * * *